UNITED STATES PATENT OFFICE.

JOSEPH T. MAHON, OF BALTIMORE, MARYLAND, ASSIGNOR TO THE HENDERSON RUBBER COMPANY, OF BALTIMORE, MARYLAND, A CORPORATION OF MARYLAND.

METHOD OF TREATING RAWHIDE.

1,359,087.  Specification of Letters Patent.  Patented Nov. 16, 1920.

No Drawing.  Application filed January 3, 1917. Serial No. 140,458.

*To all whom it may concern:*

Be it known that I, JOSEPH T. MAHON, citizen of the United States, residing at Baltimore, in the State of Maryland, have invented new and useful Improvements in Methods of Treating Rawhide, of which the following is a specification.

This invention, generally, relates to improvements in the method of treating rawhide and obtaining products therefrom described in Letters Patent No. 1,074,360, granted Sept. 30, 1913, to Albert H. Henderson.

While rawhide is specifically mentioned, this method is equally applicable to the treatment of its equivalent natural products of the animal kingdom, or the solid by-products of the animal kingdom of more or less fibrous structure, as stated in Patents Nos. 1,094,853 and 1,087,904, granted April 28, 1914, and Feb. 17, 1914, respectively, in the name of Albert H. Henderson, and issued to The Henderson Rubber Company. Therefore, where rawhide is mentioned hereinafter in the specification and claims, the word is intended to include such equivalent natural products or solid by-products of the animal kingdom as are mentioned in said patents.

The present invention relates, first, to an improved mode of treating the rawhide whereby to produce certain novel conditions in its body or substance; secondly, to a product resulting from the improved treatment hereinafter described, and having great strength and tenacity together with elastic properties, and adaptability, when combined with vulcanizing ingredients, for union or amalgamation with rubber or its recognized substitutes; and finally, to a composition of matter. The pores of the rawhide are permanently enlarged and charged with oily matter beyond the extent found in the rawhide when in its normal condition, whereupon it is masticated by suitable machinery and brought to a state of comminution; then thoroughly mixed so as to secure uniformity of product and then poured into the molds, immediately preceding which it may be combined with vulcanizing substances or with rubber if desired.

The rawhide used as the basic element, when in its natural state and dried, has great tenacity and hardness, its capacity for induration being almost equal to that of rock or steel, but under my treatment of such natural substance this quality is changed without loss but with increase of the strength and durability inherent to the natural rawhide. Owing to variations in the condition and composition of rawhide procurable in the market, difficulties are encountered under which the obtaining of a product of definite and constant properties is rendered uncertain, and I have discovered that by improvements in and modifications of the method described in the above mentioned Letters Patent, and in the sequence of steps employed in such method, such difficulties may be avoided and advantages in operation and result attained.

My invention, preferably, is carried out as follows: A given weight of rawhide in its natural state and contained in a suitable vessel is mixed, approximately, with one half of its own weight of common salt and a quantity of a soluble alkali carbonate, preferably sodium bicarbonate, in the proportion stated in the example given below. To this mixture is added about three or four times its weight of water. Said mixture is then allowed to remain for a period of about three days at a temperature of from 30° to 50° C., after which the hide, now swollen, is removed and allowed to drain in readiness for the next step of treatment. This consists in depositing the material on appropriate trays or holders, which in turn are placed upon a suitable receptacle or carriage which with its contents is then immersed in a solution consisting of about equal parts of creosote oil, turkey red oil and glycerin, plus about one per cent. of pine tar oil. Steam heat, by means of coils, is now applied and a temperature of above 75 to 80° C. maintained for two or three hours or for a length of time proportioned to the extent or bulk of the mass treated. While steam is preferably used, heat otherwise obtainable may be employed. In order to avoid the formation of glue or gelatin the temperature, under ordinary conditions, should not exceed 90° C.

The matter thus treated is then removed from the glycerin and oil bath and subjected to masticating or similar machinery, whereby thorough mixture and uniformity of such matter or product are obtained. This product may then be placed in molds or other containers so that it may cool and solidify, after which it is ready for the market, or may be worked up with vulcanizing agents or with added rubber, substantially after the manner described in said Patent No. 1,074,360.

In carrying out my invention I have found that practice under the following example is productive of good results. Take two hundred and fifty pounds of commercial rawhide in its natural state, one hundred and twenty-five pounds of common salt, and one to three pounds of sodium bicarbonate, and cover with one hundred gallons of water. Allow the whole to stand for about three days, or until the required degree of swelling of the rawhide has been reached, there being maintained during such period a temperature of say 40 degrees C. The swollen hide having been removed from the tank or receptacle is allowed to drain, after which it is placed in the glycerin and oil bath in which a constant temperature of about 80 to 90° C. is kept up. The swollen hide is allowed to remain in this bath from two to three hours, by which time the salt water contained in the substance will be replaced by the glycerin and other oily ingredients. The treated hide may then be passed through the masticator and placed in the molds. After this treatment the mass will weigh approximately three hundred and fifty pounds.

The function of the sodium bicarbonate used in the first step of the above described process is that of cleaning and purifying the rawhide, and particularly to reduce to a minimum the putrid odors arising from it. The exact quantity of sodium bicarbonate required is determinable during the treatment and will be governed by the condition of the rawhide.

The product or resultant of the method described is possessed of a high degree of toughness, durability and elasticity, and constitutes in itself an article of commerce adapted to a variety of uses. The special method herein described is one under which a product containing such qualities is readily and expeditiously obtained and combines in itself results of practical experience.

When combined with vulcanizing ingredients, the rawhide treated in the manner stated is to an improved degree fitted for union or amalgamation with rubber, or rubber substitutes which in themselves are found in the market. The permanently enlarged pores of the rawhide being charged with glycerin and oil, there is imparted to the rawhide a flexibility greater than is found therein in its normal and untreated condition, its flexibility conforming in character to that of the rubber with which it is or may be combined. Whether or not combined with rubber the rawhide mass possesses that toughness, tenacity, flexibility and elasticity which give to it an extended field of usefulness in the arts. The vulcanizing ingredients, if used, not only fit the treated rawhide for union or amalgamation with rubber, but seal its open pores and consequently prevent the escape or dissipation of the glycerin and oil with which the rawhide is virtually impregnated, the result being that the new principle of resiliency or elasticity imparted to the body remains without change or deterioration.

Having thus described my invention, I claim:—

1. The herein described method of treating rawhide so as to expand and purify it, the same consisting in subjecting said rawhide to a bath containing about six times its weight of water, 50% its weight of salt, and about one one hundredth its weight of soluble alkali carbonate substantially as set forth.

2. The herein described method of treating rawhide so as to expand and purify it, the same consisting in subjecting said rawhide for a period of about three days to a bath, at a temperature of about 40° C., consisting of about six times its weight of water, 50% its weight of salt and about one one hundredth its weight of sodium bicarbonate substantially as set forth.

3. The herein described method of treating rawhide so as to expand and purify it the same consisting in subjecting said rawhide for a period of about three days to a bath, at a temperature of about 40° C., consisting of about six times its weight of water, 50% its weight of salt and about one one hundredth its weight of sodium bicarbonate until the hide has attained a maximum degree of swelling and thereupon removing the hide from the bath and allowing it to drain thoroughly substantially as set forth.

In testimony whereof I affix my signature.

JOSEPH T. MAHON.